(12) United States Patent  
Martinelli et al.

(10) Patent No.: US 6,239,790 B1
(45) Date of Patent: *May 29, 2001

(54) FORCE SENSING SEMICONDUCTIVE TOUCHPAD

(75) Inventors: John K. Martinelli, Camarillo; Robert M. Martinelli, Temecula; Mark C. Pickett; Wendell W. Ritchey, both of Camarillo; Stuart J. Yaniger, Ventura, all of CA (US)

(73) Assignee: Interlink Electronics, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/375,797

(22) Filed: Aug. 17, 1999

Related U.S. Application Data

(63) Continuation of application No. 08/857,134, filed on May 15, 1997, now Pat. No. 5,943,044.
(60) Provisional application No. 60/023,168, filed on Aug. 5, 1996.

(51) Int. Cl.[7] .............................. G08C 21/00; G09G 5/00
(52) U.S. Cl. .................. 345/174; 178/18.01; 178/18.03; 178/18.06
(58) Field of Search ..................... 345/173, 174, 345/175, 178, 179; 178/18.01, 18.03, 18.06, 18.07, 19.03, 19.04

(56) References Cited

U.S. PATENT DOCUMENTS

| | | | |
|---|---|---|---|
| 3,921,166 | 11/1975 | Volpe . | |
| 4,079,194 | 3/1978 | Kley | 178/18.01 |
| 4,314,227 | 2/1982 | Eventoff | 339/99 |
| 4,315,238 | 2/1982 | Eventoff | 338/99 |
| 4,489,302 | 12/1984 | Eventoff | 338/99 |
| 4,550,221 | 10/1985 | Mabusth | 178/18.01 |
| 4,739,299 | 4/1988 | Eventoff et al. | 338/99 |
| 4,810,992 | 3/1989 | Eventoff | 338/99 |
| 5,374,787 | 12/1994 | Miller et al. | 178/18.03 |
| 5,521,336 | 5/1996 | Buchanan et al. | 178/18.01 |
| 5,748,185 | 5/1998 | Stephan et al. | 345/173 |
| 5,943,044 | * 8/1999 | Martinelli et al. | 345/174 |

* cited by examiner

Primary Examiner—Vijay Shankar
(74) Attorney, Agent, or Firm—Brooks & Kushman P.C.

(57) ABSTRACT

A touchpad assembly and method for providing a signal to a computer indicative of the location and applied pressure of an object touching the touchpad assembly is provided. The touchpad assembly includes X and Y position and pressure sensitive semiconductor resistance sensor layers. The X and Y sensors have a pair of spaced apart X and Y conductive traces running across opposite ends such that a resistance RX connects the pair of X traces and a resistance RY connects the pair of Y traces. The X and Y sensors come into contact at a contact point when an object asserts a pressure on the touchpad. The contact point is connected to each trace by a variable pressure resistance RZ associated with the X and Y sensors and variable position resistances of the X and Y resistances. First and second pair of timing capacitors are connected to respective ones of the pairs of X and Y traces. A microprocessor controls and monitors charging time of the capacitors to determine the position and asserted pressure of the object touching the touchpad.

22 Claims, 6 Drawing Sheets

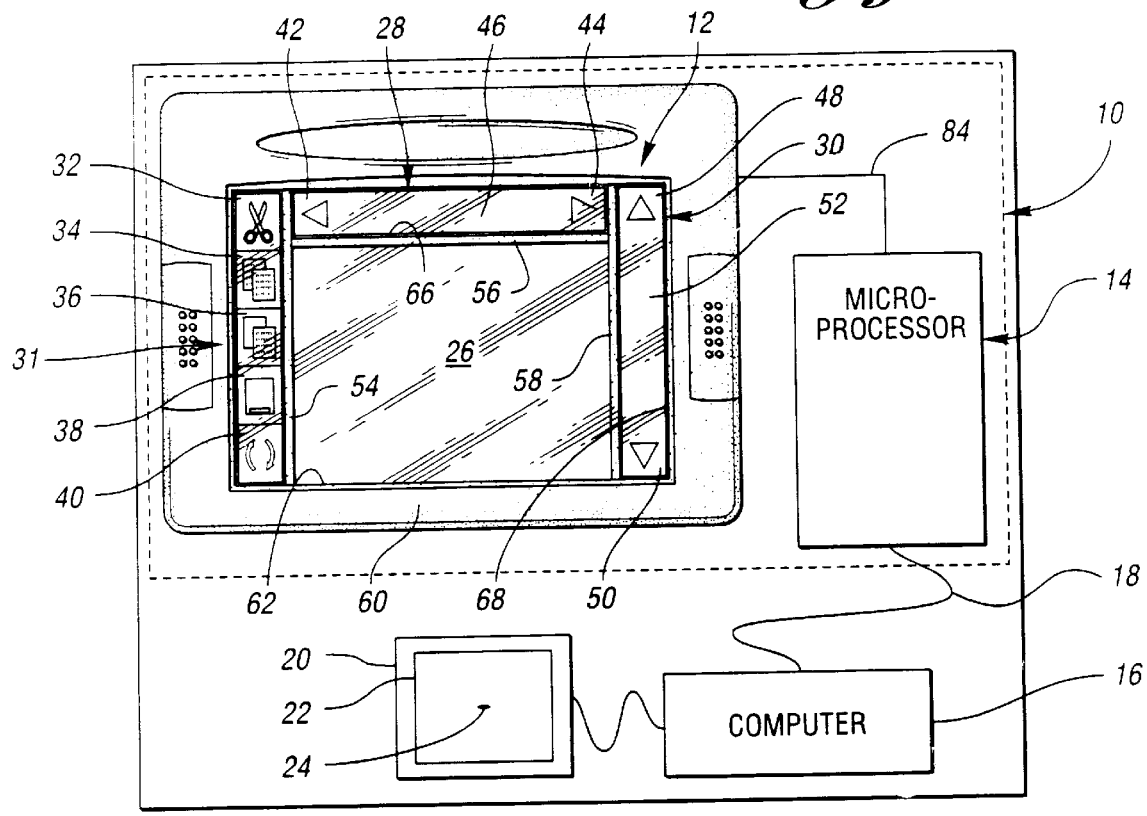
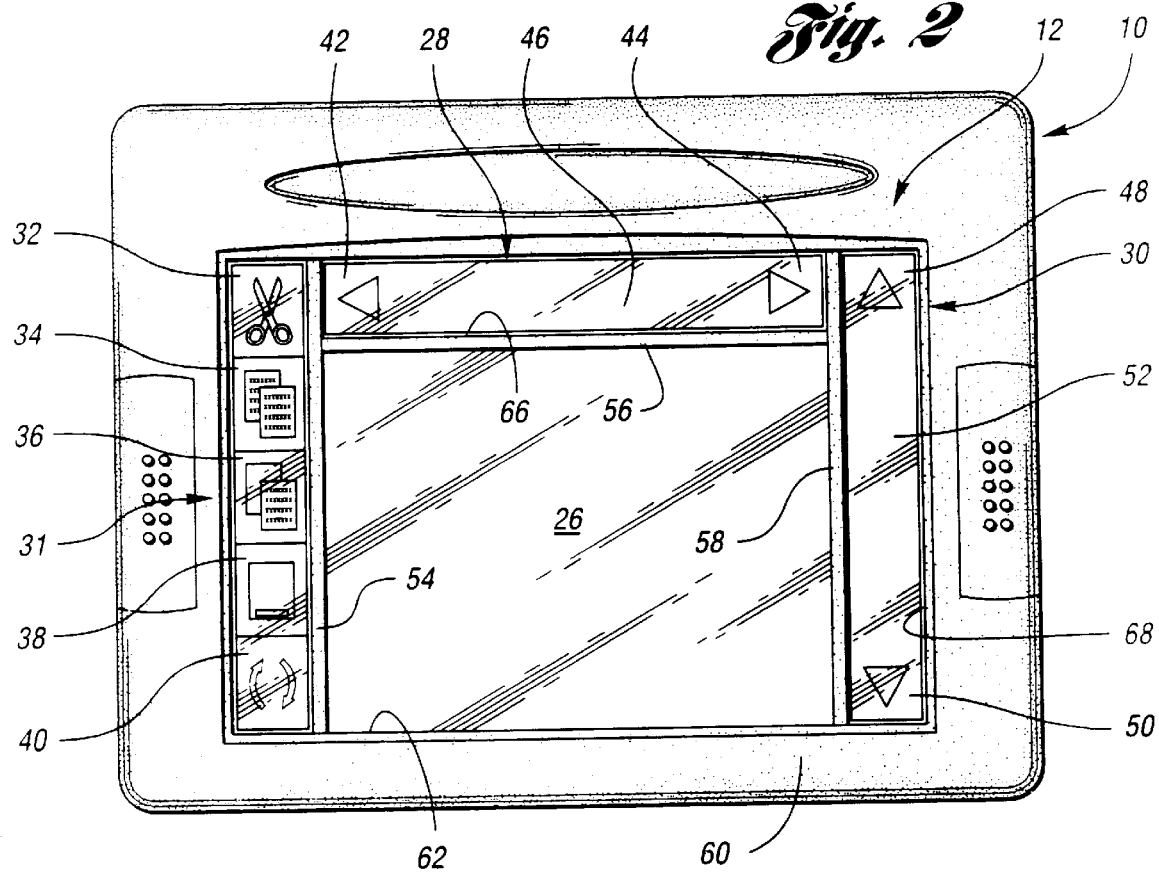

FORCE SENSING SEMICONDUCTIVE TOUCHPAD

CROSS-REFERENCE TO RELATED APPLICATION

This application is a continuation of U.S. patent application Ser. No. 08/857,134, filed May 15, 1997, now U.S. Pat. No. 5,943,044, which claims the benefit of U.S. Provisional Application No. 60/023,168, filed Aug. 5, 1996.

TECHNICAL FIELD

The present invention relates generally to object position sensing transducers and systems and, more particularly, to semiconductive touchpads.

BACKGROUND ART

Numerous devices are available as object position detectors for use in computer systems and other applications. The most familiar of such devices is the computer mouse. While extremely popular as a position indicating device, a mouse has mechanical pans and requires a surface upon which to roll its position ball. The mouse translates movement of the position ball across the rolling surface as input to a computer. The growing popularity of laptop or notebook computers has created a significant problem for mouse type technologies which require a rolling surface. Laptop computers are inherently portable and designed for use in small confined areas such as, for example, airplanes, where there is insufficient room for a rolling surface. Adding to the problem is that a mouse usually needs to be moved over long distances for reasonable resolution. Finally, a mouse requires the user to lift a hand from the keyboard to make the cursor movement, thereby upsetting the prime purpose, which is usually typing on the computer.

As a result of the proliferation of laptop computers and the standardization of the Windows operating environment, a need for a reliable, portable, and integrated form of mouse control has arisen. To satisfy this need, mechanical ball or shaft rolling technologies, such as, for example, track balls have been designed for use with laptop computers. A track ball is similar to a mouse. A major difference, however is that, unlike a mouse, a track ball does not require a rolling surface. Track balls first appeared as clip-on attachments for laptop computers and then later were integrated within laptop computers.

A track ball is large in size and does not fit well in a volume-sensitive application such as a laptop computer. Furthermore, a track ball is quite cumbersome because it requires practiced dexterity by the user as he or she interacts with the device. Finally, a track ball is not durable and is easily subjected to contamination from environmental factors such as dirt, grease, and the like.

A. Cursor Control with Touchpads

Touchpads are pointing devices used for inputting coordinate data to computers and computer-controlled devices. A touchpad is typically a bounded plane capable of detecting localized pressure on its surface. A touchpad may be integrated within a computer or be a separate portable unit connected to a computer like a mouse. When a user touches the touchpad with a finger, stylus, or the like, the circuitry associated with the touchpad determines and reports to the attached computer the coordinates or the position of the location touched. Thus, touchpads may be used like a mouse as a position indicator for computer cursor control. Several types of touchpads are known in the art such as capacitive and resistive touchpads.

1. Capacitive Touchpads

Capacitive touchpads react to a capacitive coupling between an object placed near or on the surface of the touchpad and capacitors formed within the touchpad. For instance, U.S. Pat. No. 5,374,787 issued to Miller et al. and assigned to Synaptics, Inc., discloses a capacitive touchpad having two thin layers of electrically conductive lines or traces. A first set of traces runs in a first direction and is insulated by a dielectric insulator from a second set of traces running in a second direction generally perpendicular to the first direction. The two sets of traces are arranged in a crosswise grid pattern. The grid formed by the traces creates an array of capacitors that can store an electrical charge.

When a conductive object such as a finger or a metal stylus approaches or touches the touchpad, the capacitance of the capacitors are altered due to capacitive coupling between the object and the capacitors. The degree of alteration depends on the position of the object with respect to the traces. As a result, the location of the object in relation to the touchpad can be determined and monitored as the object moves across the touchpad.

Similarly, U.S. Pat. No. 3,921,166 issued to Volpe discloses a capartive matrix or grid in which an object such as a finger changes the transcapacitance between row and column electrodes.

Another variation of the capacitive touchpad is shown in U.S. Pat. No. 4,550,221 issued to Mabusth. The Mabusth patent discloses a capacitive touchpad having a substrate that supports first and second interleaved, closely spaced, non-overlapping conducting plates. The plates are aligned in rows and columns so that edges of each plate of an array are proximate to, but spaced apart from, the edges of plates of the other array. The first and second arrays are periodically connected in a multiplexed fashion to a capacitance measuring circuit which measures the change in capacitance in the arrays. In effect, the Mabusth patent discloses a grid of pixels which are capacitively coupled.

Capacitive touchpads suffer from many disadvantages. First, they are extremely sensitive to moisture contamination. As an object such as a finger moves over the touchpad, the moisture present in the skin disturbs the capacitor grid and measurements made from the disturbance determines the position of the finger. The operation of capacitive touchpads is, therefore, easily compromised in moist or damp environments or by perspiration of the user. In short, with moisture, capacitive touchpads become confused and lose their sensitivity.

Second, capacitive touchpads demand a constant power supply, offering no sleep mode option. Most capacitive touchpads draw a constant electrical current of 2.5 to 10 milliamps whether or not they are in use. With laptops, cordless keyboards, and even hand-held remote controls, battery life is a major concern. A touchpad that demands constant power is a major liability.

Third, capacitive touchpads are prone to inadvertent cursor positioning because they sense an object as it gets near their surface. This is problematic for the user because if the touchpad is installed near where the thumbs of the user naturally rest while typing, an inadvertent thumb simply moving over and above the touchpad can cause a false click and an unintended change in the cursor position. This can result in repeated, accidental repositioning of the cursor and high levels of user frustration. The user may also experience fatigue and extreme discomfort from intentionally holding his thumbs or fingers away from the touchpad to avoid false clicks.

Fourth, the electronic circuitry of capacitive touchpads is complex and expensive. Capacitive touchpads use a microprocessor for communicating with a computer. Between the touchpad and the microprocessor, electronic circuitry such as a semi-custom or fully-custom mixed signal gate array incorporating both analog and digital sections is provided. The cost of this circuitry is significant and, in most cases, higher than the cost of the microprocessor.

Fifth, capacitive touchpads indirectly measure the amount of applied pressure by measuring the surface area of the object applying the pressure. For instance, a capacitive touchpad measures the area of contact between a finger and the touchpad. Once that area is measured, relative pressure is determined by the change in the area over time. Illustratively, as a user pushes harder with his finger, more area is in contact and the touchpad estimates a greater pressure. Obviously, for applications such as signature capture, pressure-controlled scrolling and acceleration, 3D control, and the like, measuring the contact area to estimate the pressure is greatly inferior to measuring the actual pressure directly.

2. Resistive Touchpads

U.S. Pat. No. 5,521,336 issued to Buchanan et al. discloses a typical resistive touchpad. The disclosed resistive touchpad is a shunt mode device where electrons flow between interdigitating conductive traces when the traces are pressed together. A voltage potential between the interdigitating traces causes electrical current to flow through the traces at the point where the traces are in electrical contact. The location of the contact is determined using banks of drivers and receivers which scan the resistive touchpad.

Resistive touchpads may include a resistive layer separating the interdigitating traces at the point of contact. Thus, when a pair of traces are pressed together against the resistive layer at a location, electrical current flows from one trace through the resistive layer to the other trace at that location.

Resistive touchpads such as that disclosed by Buchanan et al. suffer from many disadvantages. First, resistive touchpads can only measure ON/OFF resistance. Thus, they cannot measure gradation in pressure and cannot be used for such applications as signature capture, pressure-controlled scrolling and acceleration, 3D control, and the like.

Second, the electronic circuitry of resistive touchpads is complex and expensive. Like capacitive touchpads, resistive touchpads have a microprocessor for communicating with a computer. Between the touchpad and the microprocessor, complex circuitry such as the banks of drivers and receivers shown in Buchanan et al. are provided. The cost of this circuitry is significant and, in most cases, higher than the cost of the microprocessor.

Third, resistive touchpads require a relatively significant force to activate, roughly about twenty grams of force. Unfortunately for the user, pushing his or her finger or a stylus against a touchpad at twenty grams of force is fatiguing.

B. Touchpads as Input Devices

In addition to cursor control, touchpads are also employed for providing control signals to a computer to perform functions associated with the location pressed on the touchpad. Typically, one or more regions of a touchpad are assigned to certain functions. The user is made aware of the function associated with each region by a template. A template is a sheet with a graphic design and is placed over and in contact with the touchpad surface. The graphic design maps out regions of the touchpad surface which are labelled to provide a reminder to the user as to the functions associated with the regions.

As an input device, a touchpad functions similarly to a mouse. For instance, a mouse generally has at least one mouse button for accomplishing mouse controlled functions such as menu pull down and selection, icon selection and use, and the like. Sometimes more buttons having assigned functions are provided with a mouse. The various mapped regions of the touchpad may be associated with the assigned functions of the mouse.

A primary disadvantage of using prior art touchpads as input devices is that the touchpads do not incorporate actual pressure data in their control signals. It is desirable to control the rate that a computer performs a function in proportion to the amount of actual pressure being applied to the input device. For example, if a user presses down in a scroll control region wanting a graphical user interface display to scroll, it is desirable that the rate of scrolling is proportional to the amount of pressure applied. In short, more pressure should cause faster scrolling.

Furthermore, prior art touchpads are not user friendly. For instance, many portable touchpads include a button on the bottom of the touchpad which, when pressed, is used to emulate the selection function of the button on a mouse. When the user desires to drag the cursor across the display, the button must be held down. When the cursor must be moved relatively long distances, necessitating multiple touchpad strokes, it is difficult to hold the drag button down to prevent release of the button and termination of the drag sequence while accomplishing the multiple strokes. If the finger is simply lifted from the touchpad, the drag sequence terminates and must be restarted. Even if the cursor can be dragged with a single touchpad stroke, it is extremely difficult to maintain sufficient pressure on the touchpad to hold the button down while sliding a finger across the touchpad. Consequently, in using touchpads for dragging, the drag sequences are frequently unintentionally terminated.

Summary of the Invention

Accordingly, it is an object of the present invention to provide a touchpad having the ability to measure the actual pressure applied by an object and the location of the object touching the touchpad.

It is a further object of the present invention to provide a force sensing semiconductive touchpad.

It is another object of the present invention to provide a force sensing semiconductive touchpad having the ability to determine the position of an object touching the touchpad.

It is yet a further object of the present invention to provide a force sensing semiconductive touchpad having the ability to measure the gradation of pressure applied on the touchpad and offer dynamic pressure-sensing features.

It is yet another object of the present invention to provide a force sensing semiconductive touchpad that requires minimal power consumption.

It is still yet a further object of the present invention to provide a force sensing semiconductive touchpad having the characteristics of requiring minimal amount of force to be activated, not subjecting a user to fatigue, and not susceptible to inadvertent cursor positioning.

It is still yet another object of the present invention to provide a force sensing semiconductive touchpad that is unaffected by ordinary amounts of moisture occurring during use.

A further object of the present invention is to provide a force sensing semiconductive touchpad that uses cheap and simple electronic circuitry for determining the position and applied pressure of an object touching the touchpad.

Another object of the present invention is to provide a touchpad that provides a control signal having actual pressure data to a computer so that the computer performs a function in proportion to the amount of actual pressure being applied to the touchpad.

Still, a further object of the present invention is to provide a touchpad that is user friendly.

Still, another object of the present invention is to provide a touchpad having separate control regions linked to separate functions.

Still, yet a further object of the present invention is to provide a touchpad capable of gesture recognition for supporting single tap select gesture, double tap execute gesture, and tap and drag dragging gesture to simulate actions done on a mouse button.

Still, yet another object of the present invention is to provide a touchpad having edge continuation motion for allowing large cursor excursions with a relatively slight single gesture.

In carrying out the above objects, the present invention provides a touchpad for providing a signal to a computer. The signal is indicative of the location and applied pressure of an object touching the touchpad. The touchpad includes a pad having a touch surface and a bottom surface. A first sensor layer is disposed adjacent the bottom surface of the pad. A first pair of spaced apart conductive traces runs across opposite ends of the first sensor layer in a first direction such that a first resistance between the opposite ends of the first sensor layer connects the first pair of conductive traces.

The touchpad further includes a second sensor layer. A second pair of spaced apart conductive traces runs across opposite ends of the second sensor layer in a second direction generally perpendicular to the first direction such that a second resistance between the opposite ends of the second sensor layer connects the second pair of conductive traces. The second sensor layer is disposed beneath the first sensor layer such that the first and second sensor layers come into contact at a contact point when an object asserts a pressure on the touch surface of the pad. The contact point is connected to each conductive trace by a variable pressure resistance associated with the first and second sensor layers and variable position resistances of the first and second sensor layers. The variable pressure resistance varies inversely as a function of the pressure asserted and the variable position resistances vary proportionally as a function of the distance of the contact point from the conductive traces.

The touchpad may further include a first pair of timing capacitors each connected to a respective one of the first pair of conductive traces and a second pair of timing capacitors each connected to a respective one of the second pair of conductive traces. The touchpad may also include a microprocessor operative with the timing capacitors for controlling and monitoring charging time of the timing capacitors to determine the position and asserted pressure of the object on the touch surface of the pad.

Further, in carrying out the above objects, a method for providing a signal to a computer representative of a position and asserted pressure of an object touching a touchpad is provided. The method is for use with a touchpad having X and Y position and Z pressure sensitive sensor layers in which the X and Y sensor layers come into contact at a contact point when the object touches the touchpad. The method includes providing a pair of spaced apart X conductive traces running across opposite ends of the X sensor layer along a Y direction such that a resistance RX between the opposite ends of the X sensor layer connects the pair of X conductive traces. Then a pair of spaced apart Y conductive traces running across opposite ends of the Y sensor layer along an X direction generally perpendicular to the Y direction is provided such that a resistance RY between the opposite ends of the Y sensor layer connects the pair of Y conductive traces is provided.

The X conductive traces are then driven to a given voltage so that current flows from the contact point through a variable pressure resistance RZ across variable position resistances to the pair of Y conductive traces. The position of the object is then determined along a Y direction on the Y sensor layer as a function of the current flowing from the contact point to the pair of Y conductive traces. The current varies as a function of the variable pressure resistance RZ and the variable position resistances connecting the pair of Y conductive traces to the contact point.

The Y conductive traces are then driven to a given voltage so that current flows from the contact point through a variable pressure resistance RZ across variable position resistances to the pair of X conductive traces. The position of the object is then determined along an X direction on the X sensor layer as a function of the current flowing from the contact point to the pair of X conductive traces. The current varies as a function of the variable pressure resistance RZ and the variable position resistances connecting the pair of X conductive traces to the contact point. The Z pressure of the object touching the touchpad is then determined from the currents flowing from the contact point to the pairs of X and Y conductive traces.

Determining the position of the object along the X and Y directions may be performed by determining the time required for the current to charge timing capacitors connected to the respective ones of the X and Y conductive traces.

The advantages accruing to the present invention are numerous. For instance, the touchpad of the present invention provides a touchpad for providing a signal to a computer indicative of the location and applied pressure of an object touching the touchpad. The touchpad has the ability to measure the gradation of pressure applied on the touchpad and offer dynamic-sensing features.

These and other features, aspects, and embodiments of the present invention will become better understood with regard to the following description, appended claims, and accompanying drawings.

BRIEF DESCRIPTION OF THE DRAWINGS

FIG. 1 is an overall block diagram of a touchpad assembly of the present invention employed with a computer;

FIG. 2 is a top plan view of a touchpad of the present invention;

FIG. 10b is a schematic circuit diagram of the left branch of the circuit diagram of FIG. 10a;

FIG. 10c is a schematic circuit diagram of the right branch of the circuit diagram of FIG. 10a;

FIG. 11b is a schematic circuit diagram of the left branch of the circuit diagram of FIG. 11a;

FIG. 11c is a schematic circuit diagram of the right branch of the circuit diagram of FIG. 11a;

BEST MODES FOR CARRYING OUT THE INVENTION

Figure 3:
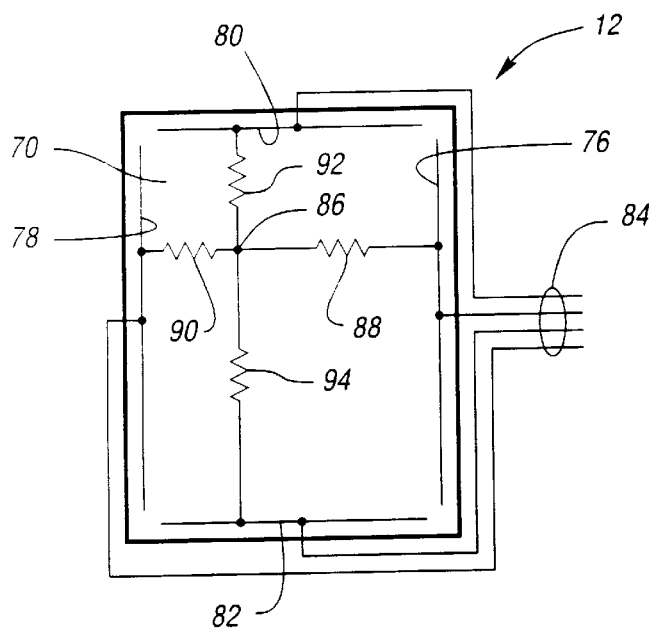
FIG. 3 illustrates the electrical resistance associated with a position semiconductor resistance sensor of the touchpad.

Referring now to FIGS. 1 and 2, a force sensing semiconductive touchpad assembly 10 of the present invention is shown. Touchpad assembly 10 is a touch-sensitive user input device. Touchpad assembly 10 includes a touchpad 12 and a microcontroller 14. Touchpad assembly 10 provides information indicative of the position of an operator's finger or stylus touching touchpad 12 to a computer 16 through a communications link 18. Touchpad assembly 10 also provides information indicative of the actual amount of pressure applied by an operator on touchpad 12. Computer 16 processes the information to control functions of a graphical user interface 20 producing a display 22 having a cursor 24. An operator may also select commands or manipulate graphically portrayed objects in graphical user interface 20 with touchpad assembly 10. Preferably, touchpad assembly 10 is built into a computer keyboard and positioned below the space bar of the keyboard so that an operator can manipulate touchpad 12 with his or her thumbs. Alternatively, touchpad assembly 10 is a portable device like a mouse.

Touchpad 12 includes a cursor control region 26, a pan control region 28, and a scroll control region 30. Pan control region 28 is horizontally disposed adjacent cursor control region 26. Scroll control region 30 is vertically disposed adjacent cursor control region 26.

When an operator touches cursor control region 26, touchpad 12 provides a cursor control signal to computer 16 based on the position and pressure applied by the operator in the cursor control region. In response to the cursor control signal, computer 16 controls the position of cursor 24 in graphical user interface 20. Similarly, when the operator touches pan control region 28, touchpad 12 provides a pan control signal to computer 16 based on the position and force applied by the operator in the pan control region. In response to the pan control signal, computer 16 causes at least a portion of graphical user interface 20 to pan. Lastly, scroll control region 30 provides a scroll control signal to computer 16 which causes graphical user interface 20 to scroll upon the operator touching the scroll control region.

Touchpad 12 further includes a function region 31. Function region 31 comprises a first control region 32, a second control region 34, a third control region 36, a fourth control region 38, and a fifth control region 40. Each of these control regions are linked to functions in graphical user interface 20. Thus, upon touching one of these control regions, touchpad 12 provides a control signal to computer 16 which then performs the function. Function region 31, which is vertically disposed adjacent cursor control region 26, is covered with a template with graphic designs. The graphic designs are representative of the functions associated with the control regions. All of the control regions, including cursor control region 26, pan control region 28, and scroll control region 30, are portions of a single touchpad member or alternatively, are comprised of separate touchpad members.

In a preferred embodiment, first control region 32 is linked to a function for controlling cursor 24 in graphical user interface 20. Also, preferably, second control region 34 is linked to a pan function and third control region 36 is linked to a scroll function in graphical user interface 20.

Pan control region 28 has a left portion 42 and a right portion 44. When an operator touches left portion 42, graphical user interface 20 pans to the left. Similarly, graphical user interface 20 pans to the right when an operator touches right portion 44. A primary advantage of touchpad assembly 10 is that touchpad 12 has the capability of directly measuring the actual pressure applied by the operator. As a result, computer 16 may control a rate of panning in proportion to a variable amount of pressure applied to pan control region 28 by an operator.

Pan control region 28 is further provided with a central portion 46 located between left portion 42 and right portion 44. Computer 16 controls a rate of panning in proportion to a distance of the touch of an operator in pan control region 28 away from central portion 46.

Scroll control region 30 has an upper portion 48 and a lower portion 50. An upwards scroll of graphical user interface 20 corresponds to the touch of an operator toward upper portion 48 of scroll control region 30. A downwards scroll of graphical user interface 20 corresponds to the touch of an operator toward lower portion 50 of scroll control region 30. Like pan control region 28, scroll control region 30 is pressure sensitive. As a result, computer 16 may control a rate of panning in proportion to a variable amount of pressure applied to scroll control region 30 by an operator.

Scroll control region 30 is further provided with a central portion 52 located between upper portion 48 and lower portion 50. Computer 16 controls a rate of scrolling in proportion to a distance of the touch of an operator in scroll control region 28 away from central portion 52.

Cursor control region 26, pan control region 28, and scroll control region 30 are separated by a visual cue on touchpad 12. Preferably, the visual cue is a printed stripe. Touchpad 12 further includes raised ridges 54, 56, and 58 which separate cursor control region 26, pan control region 28, scroll control region 30, and function region 31.

Touchpad 12 is provided with a cover 60 having a cursor control region pane 62, a function region pane 64, a pan control region pane 66, and a scroll control region pane 68. Panes 62, 64, and 66 form openings to designate the various regions.

Figure 4:
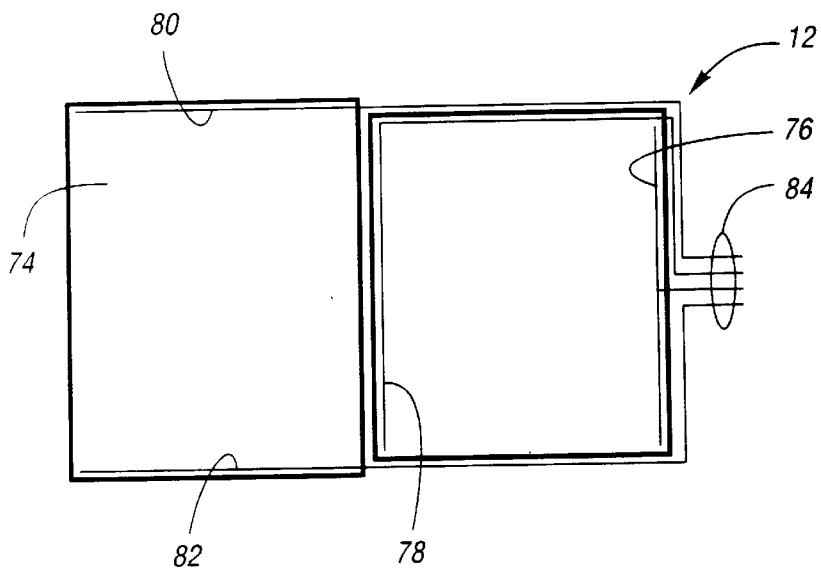
FIG. 4 is a top view of X and Y position semiconductor resistance sensors of the touchpad unfolded with associated pairs of X and Y conductive leads.

Referring now to FIGS. 3 and 4, touchpad 12 includes a position semiconductor resistance sensor 70. Position sensor 70 comprises an X position semiconductor resistance sensor 72 folded over a Y position semiconductor resistance sensor 74 (shown best in the unfolded view of FIG. 4). A pair of electrically conductive X output leads or traces 76 and 78 run along opposite ends of X position sensor 72. Similarly, a pair of electrically conductive Y output leads or traces 80 and 82 run along opposite ends of Y position sensor 74. X output leads 76 and 78 and Y output leads 80 and 82 are oriented 90 degrees with respect to each other. All of the leads are arranged together at 84 for connection to position and pressure processing electronic circuitry.

Position sensors 72 and 74 are semiconductive layers having a given surface resistivity and an associated electrical resistance. Electrical current flows across position sensors 72 and 74 when a voltage potential exists between respective output leads. For example, current flows from X output lead 76 across X position sensor 72 to X output lead 78 when the X output leads are at different potentials. Similarly, current flows from Y output lead 80 across Y position sensor 74 to Y output lead 82 when the Y output leads are at different potentials.

Touchpad 12 provides X and Y position data for a contact location such as point 86 based on the electrical resistance properties of X and Y position sensors 72 and 74. To illustrate, point 86 is arbitrarily located on touchpad 12 and is located an arbitrary distance away from each output lead. Thus, a resistance is between point 86 and the respective output leads. The resistance between point 86 and an output lead is a function of the given surface resistivity of position sensor 70 and the length of the portion of the position sensor separating the point and the output lead.

Current flows from point 86 across position sensor 70 to an output lead when the output lead and the point are at different potentials. The resistance between point 86 and an output lead is high if a large portion of position sensor 70 separates point 86 and the output lead. Correspondingly, the resistance is low if only a small portion of position sensor 70 separates point 86 and the output lead.

As shown in FIGS. 3 and 4, a resistance RXH 88 is between point 86 and X output lead 76 on one side of X position sensor 72 and a resistance RXL 90 is between the point and X output lead 78 on the other side of the X position sensor. The resistances RXH 88 and RXL 90 added in series is the X direction resistance RX. In turn, a resistance RYH 92 is between point 86 and Y output lead 80 on one side of Y position sensor 74 and a resistance RYL 94 is between the point and Y output lead 82 on the other side of Y position sensor. The resistances RYH 92 and RYL 94 added in series is the Y direction resistance RY. Accordingly, the resistance variables (RXH, RXL, RYH, and RYL) depend on the position of point 86. Touchpad assembly 10 manipulates the resistance variables to determine the position and pressure of an object touching touchpad 12.

As shown in FIG. 4, X and Y position sensors 72 and 74 are unfolded for illustrative purposes. x position sensor 72 preferably has a length in the X direction of 1.8 inches and a length in the Y direction of 2.4 inches. Y position sensor 74 preferably has a length in the X direction of 1.82 inches and a length in the Y direction of 2.4 inches. X output leads 76 and 78 preferably have a width of 0.02 inches running along X position sensor 72. Y output leads 80 and 82 preferably have a width of 0.03 inches running along Y position sensor. At 84, the output leads are preferably spaced 0.01 inches from each other.

Figure 5:
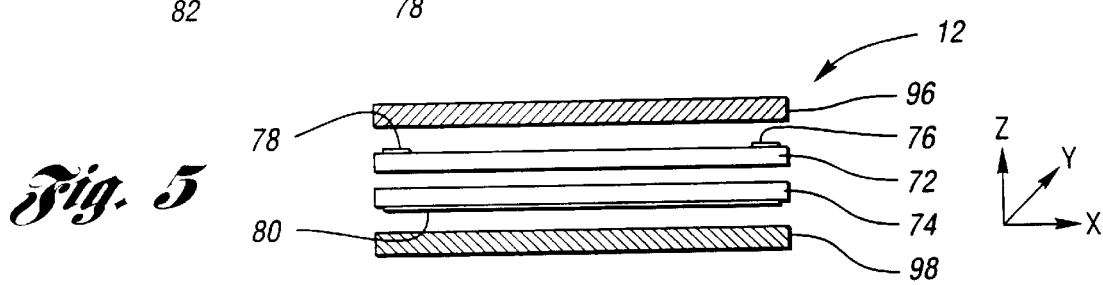
FIG. 5 is a side view of the X and Y position semiconductor resistance sensors folded together.

As shown in FIG. 5, X position sensor 72 and Y position sensor 74 are folded when in use with touchpad 12. Note how X output lead 76 and Y output leads 80 and 82 run orthogonally with respect to each other. Also note how Y output leads 80 and 82 are on opposite ends of Y position sensor 74. Furthermore, X output leads 76 and 78 and Y output leads 80 and 82 are positioned on opposite sides of their respective position sensors so that they never come in direct electrical contact and result in a short circuit. Of course, the leads may be positioned on adjacent sides of their respective position sensors as long as they are separated by an insulator such as a piece of tape to prevent direct electrical contact.

Still referring to FIG. 5, touchpad 12 includes a pad surface 96 and a printed circuit board 98. Pad surface 96 is exposed for an operator to touch. Touchpad assembly 10 determines the location and pressure applied by the operator touching a point on pad surface 96. Printed circuit board 98 is provided with microcontroller 14 and outputs for communication link 18 to computer 16.

Figure 6:
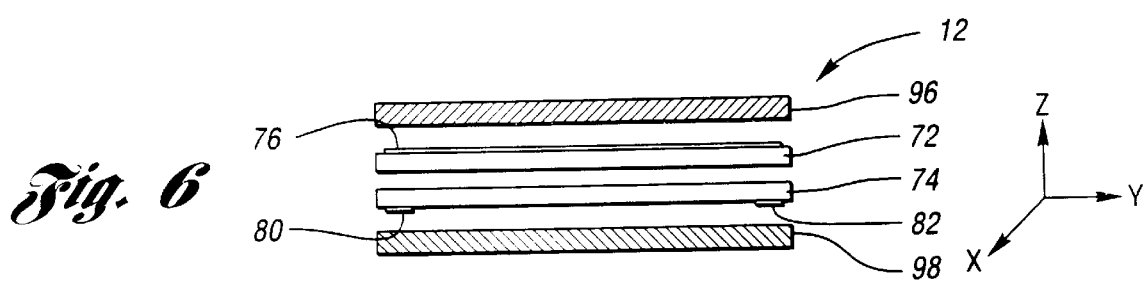
FIG. 6 is FIG. 5 rotated by 90 degrees.

Referring now to FIG. 6, touchpad 12 has been rotated by 90 degrees from the side view shown in FIG. 5. Note how Y output lead 80 runs along Y position sensor 74 from one edge to the other. Also note how X output leads 76 and 78 are disposed on opposite ends of X position sensor 72.

In addition to the X and Y direction resistances discussed above, each position sensor also has a resistance associated with the Z direction. The resistance in the Z direction is a function of the resistivity and the thickness of the position sensor. Position sensors 72 and 74 are pressure sensitive sensors as described in U.S. Pat. No. 4,489,302 issued to Eventoff. The patent to Eventoff is incorporated in its entirety herein by reference. As taught by Eventoff, the resistance of position sensors 72 and 74 in the Z direction varies inversely as a function of applied pressure.

Thus, when position sensors 72 and 74 are pressed together, a resistance RZ is produced. Touchpad 12 is a through mode device where electrons flow between the two separate X and Y position sensors 72 and 74 when the sensors are pressed together at contact point 86. The flow of electric current occurs through X and Y position sensors 72 and 74 at contact point 86 and across the X and Y position sensors to the respective output leads.

Figure 7:
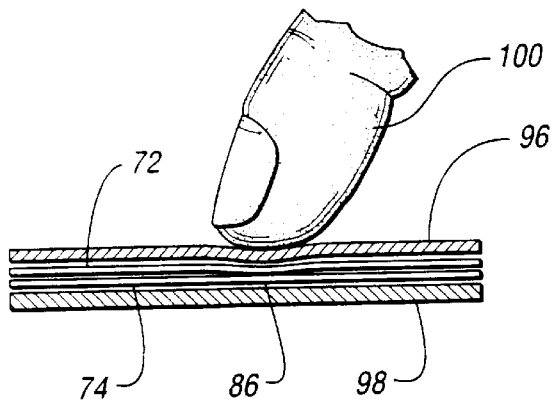
FIG. 7 illustrates a light touch activating the X and Y position semiconductor resistance sensors.
Figure 8:
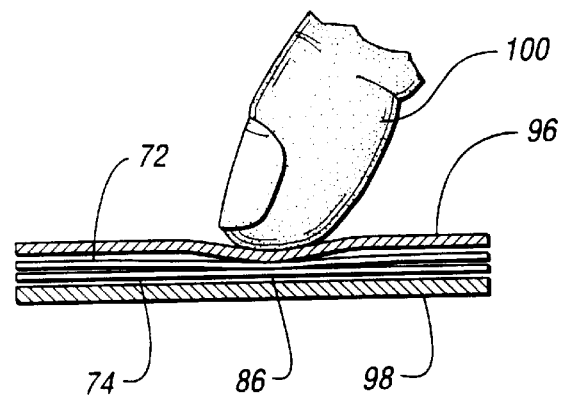
FIG. 8 illustrates a heavy touch activating the X and Y position semiconductor resistance sensors.

Referring now to FIGS. 7 and 8, position sensors 72 and 74 are pressed together at contact point 86 when a finger 100 touches pad surface 96. If a light touch is applied by finger 100 on pad surface 96 then the resistance RZ is large. As finger 100 applies a harder touch as shown in FIG. 8, the RZ resistance decreases. In essence, the resistance RZ varies inversely on the amount of applied pressure at point 86.

Figure 9:
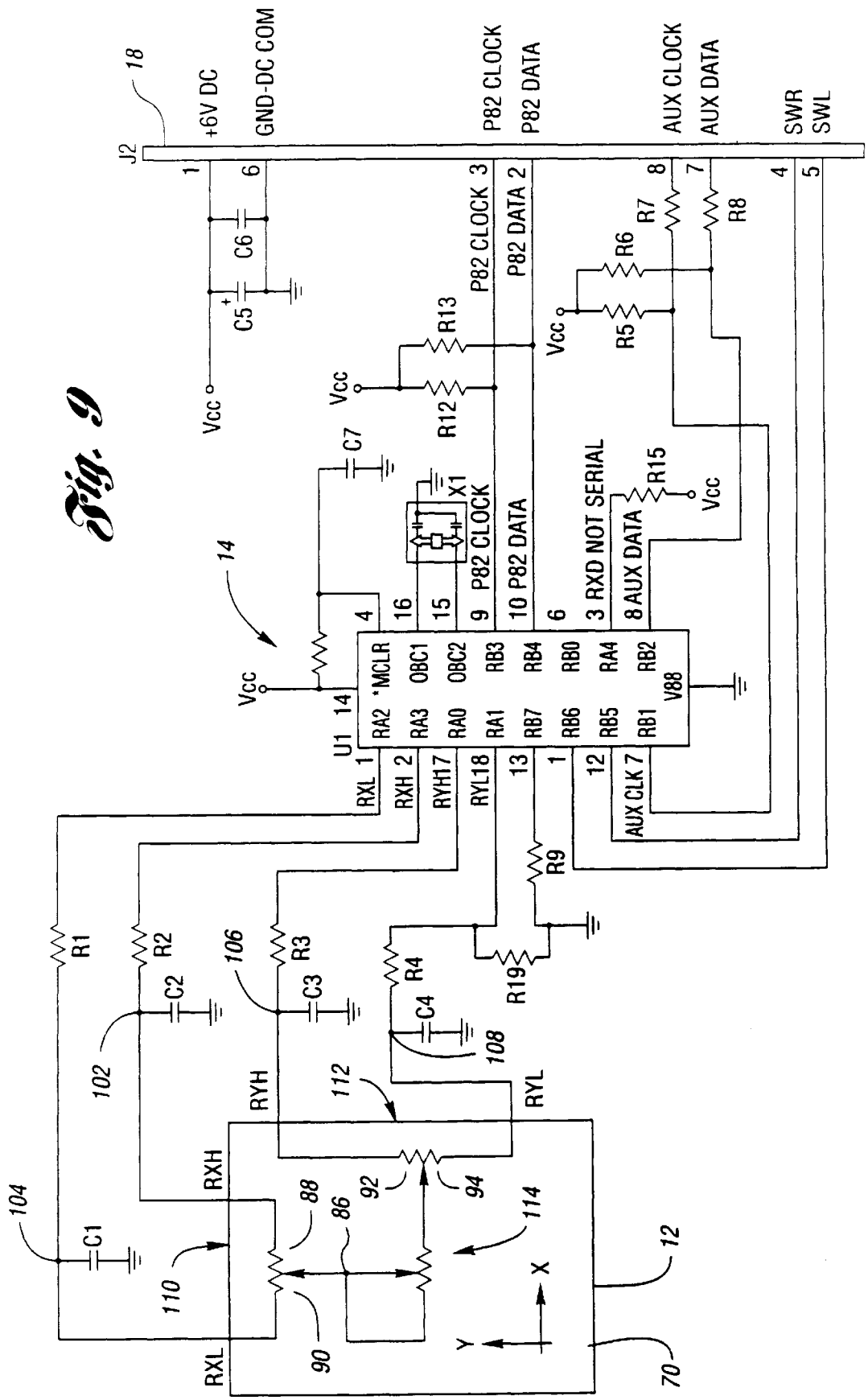
FIG. 9 is a schematic circuit diagram of the electronic circuitry of the touchpad assembly.

Referring now to FIG. 9, the operation of touchpad assembly 10 in using the resistance RZ and the resistance variables (RXH, RXL, RYH, and RYL) to determine the position and applied pressure of an object touching touchpad 12 will be described. Touchpad 12 is connected to microcontroller 14 at four nodes. The nodes are RXH node 102, RXL node 104, RYH node 106, and RYL node 108. Resistance RXH 88 and resistance RXL 90 are in series between RXH node 102 and RXL node 104. Resistance RXH 88 and resistance RXL 90 added together equals a resistance RX 110. Similarly, resistance RYH 92 and resistance RYL 94 are in series between RYH node 106 and RYL node 108. Resistance RYH 92 and resistance RYL 94 added together equals a resistance RY 112. A resistance RZ 114 is connected between resistance RX 110 and resistance RY 112.

Between each node and microcontroller 14 is a capacitor and a resistor. The capacitor is parallel with respect to the resistor and microcontroller 14. Thus, the capacitor creates a capacitor bridge. For instance, between RXL node 104 and the first port of microcontroller 14 is a timing capacitor C1 and a resistor R1. Timing capacitor C1 is parallel with respect to R1 and microcontroller 14. Timing capacitors C2, C3, and C4 and resistors R2, R3, and R4 are similarly arranged with respect to associated nodes and ports of microcontroller 14.

Microprocessor 14 performs measurements on the amount of time that the capacitors need to charge to a given voltage. As known to those of ordinary skill in the art and freshman physics students, the amount of charging and discharging time for a capacitor in a closed circuit varies as a function of the resistance in series with the capacitor. The charging and discharging times are a function of the product of the resistance (R) of the resistor multiplied by the capacitance (C) of the capacitor. The product RC is known as the capacitive time constant.

In operation, as pressure is applied to touchpad 12 at contact point 86, resistance RZ 114 changes inversely as a function of the pressure applied. As described above, resistance RXH 88 and resistance RXL 90 are proportional with respect to the horizontal position of contact point 86 along the X direction of touchpad 12. Correspondingly, resistance RYH 92 and resistance RYL 94 are proportional with respect to the vertical position of contact point 86 along the Y direction of touchpad 12.

Microprocessor 14 preferably includes one Microchip PIC 16C622 microcontroller. Microprocessor 14 performs positional and pressure measurements as follows. First, the nodes (102, 104, 106, 108) are driven by microprocessor 14 to 0 volts for a sufficient time to allow timing capacitors C1, C2, C3 and C4 to fully discharge. Then RXH node 102 and RXL node 104 are driven to a given voltage VCC by microprocessor 14. Preferably, the given voltage VCC is the supply voltage of +5 volts. Timing capacitors C3 and C4 charge at a rate proportional to the resistance between it and VCC and its capacitance. The resistance is determined by the position and applied pressure on contact point 86.

Resistors R1, R2, R3, and R4 are preferably 470 ohm current limiting resistors to prevent the maximum output current from microprocessor 14 to approximately 10 milliamps maximum. The 10 milliamps is well below the microcontroller device specification. Timing capacitors C1, C2, C3, and C4 are preferably 0.047 micro farad.

Figure 10A:
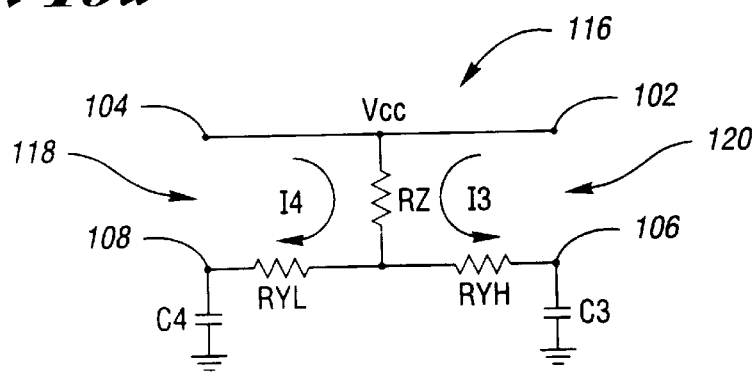
FIG. 10a is a schematic circuit diagram when conductive traces disposed on the opposite sides of the X position semiconductor resistance sensor are driven to the same electric potential.

FIG. 10a shows a circuit 116 for touchpad 12 when RXH node 102 and RXL node 104 are driven to VCC. A current I4 flows from VCC through a left branch 118 of circuit 116 to timing capacitor C4. Similarly, a current I3 flows through a right branch 120 of circuit 116 to timing capacitor C3. From Kirchoff's Voltage Law in which Voltage (V)=Current (I)*Resistance (R), the magnitude of the currents I3 and I4 depend on the resistance that they flow across. In turn, the time that it takes the timing capacitors C3 and C4 to charge depends on the magnitude of the currents I3 and I4.

Figure 10B:
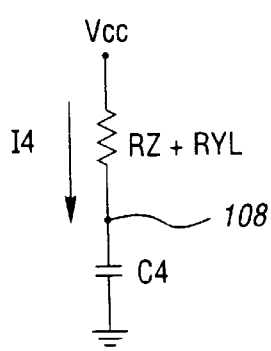
Figure 10C:
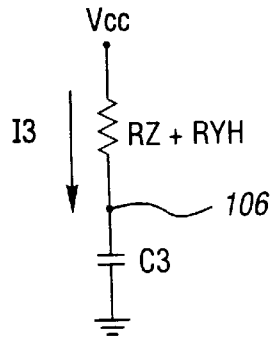

As shown in FIG. 10b, timing capacitor C4 and a resistance equaling the summation of resistance RZ 114 and resistance RYL 94 are in series. Similarly, as shown in FIG. 10c, timing capacitor C3 and a resistance equaling the summation of the resistance RZ 114 and resistance RYH 92 are in series.

Microprocessor 14 measures the time that it takes timing capacitors C3 and C4 to charge to a predetermined voltage after driving RXH node 102 and RXL node 104 to VCC. Preferably, microprocessor 14 logs the time TRYH when timing capacitor C3 charges to 3 volts. The voltage of timing capacitor C3 is monitored at RYH node 106. Microprocessor 14 also logs the time TRYL when timing capacitor C4 charges to 3 volts. The voltage of timing capacitor C4 is monitored at RYL node 108. If timing capacitors C3 and C4 do not charge to the predetermined voltage within 8 milliseconds then the measurement process is aborted due to inadequate force to activate.

Next microprocessor 14 drives the nodes (102, 104, 106, 108) to 0 volts for a sufficient time to allow timing capacitors C3 and C4 to fully discharge. Microprocessor 14 then drives RYH node 106 and RYL node 108 to VCC. Timing capacitors C1 and C2 then charge at a rate proportional to the resistance between it and VCC and its capacitance.

Figure 11C:
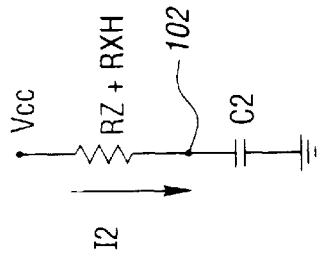
Figure 11B:
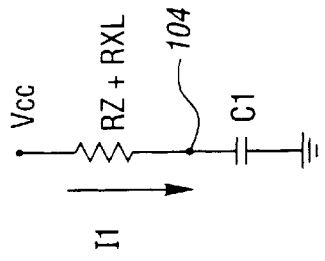
Figure 11A:
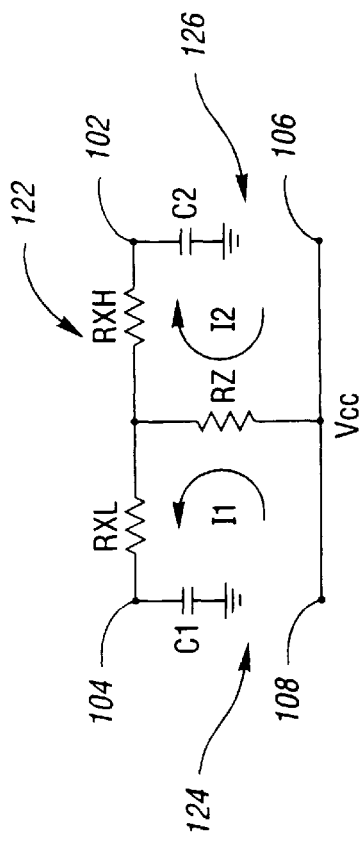
FIG. 11a is a schematic circuit diagram when conductive traces disposed on the opposite sides of the Y position semiconductor resistance sensor are driven to the same electric potential.

FIG. 11a shows a circuit 122 for touchpad 12 when RYH node 106 and RYL node 108 are driven to VCC. A current I1 flows from VCC through a left branch 124 of circuit 122 to timing capacitor C1. Similarly, a current I2 flows through a right branch 126 of circuit 122 to timing capacitor C2. The magnitude of the currents I1 and I2 depend on the resistance that they flow across. In turn, the time that it takes the currents I1 and I2 to charge timing capacitors C1 and C2 depends on the resistance.

As shown in FIG. 11b, timing capacitor C1 and a resistance equaling the summation of resistance RZ 114 and resistance RXL 90 are in series. Similarly, as shown in FIG. 11c, timing capacitor C2 and a resistance equaling the summation of the resistance RZ 114 and resistance RXH 88 are in series.

Microprocessor 14 measures the time that it takes timing capacitors C1 and C2 to charge to the predetermined voltage of 3 volts after driving RYH node 106 and RYL node 108 to VCC. Microprocessor 14 logs the time TRXL when timing capacitor C1 charges to 3 volts. The voltage of timing capacitor C1 is monitored at RXL node 104. Microprocessor 14 also logs the time TRXH when timing capacitor C2 charges to 3 volts. The voltage of timing capacitor C2 is monitored at RXH node 102. If timing capacitors C1 and C2 do not charge to the predetermined voltage within 8 milliseconds then the measurement process is aborted due to inadequate force to activate.

With the time measurements TRXH, TRXL, TRYH, and TRYL, microprocessor 14 computes the position and applied pressure on contact point 86. The position and pressure data is then converted to the appropriate communications format and transmitted to computer 16 through communications link 18.

As an overview, if the time measurements TRYH is equal to TRYL, then the vertical position of contact point 86 is directly in the middle of touchpad 12 along the Y axis. If TRYP is greater than TRYL, then the vertical position of contact point 86 is towards the bottom of touchpad 12 along the Y axis. Conversely, if TRYL is greater than TRYH, then the vertical position of contact point 86 is towards the top of touchpad 12 along the Y axis.

For the X axis, if TRXH is equal to TRXL then the horizontal position of contact point 86 is directly in the middle of touchpad 12 along the X axis. If TRXH is greater than TRXL, then the horizontal position of contact point 86 is towards the left side of touchpad 12 along the X axis. If TRXL is greater than TRXH, then the horizontal position of contact point 86 is towards the right side of touchpad 12 along the Y axis.

Microprocessor 14 performs the following calculations to determine the vertical and horizontal position of an object touching touchpad 12 along with the applied pressure of the object.

Constants

Tmaxry=Proportional to maximum amount of resistance along the Y axis of touchpad 12 and capacitance of a timing capacitor.

Tmaxrx=Proportional to maximum amount of resistance along X axis of touchpad 12 and capacitance of a timing capacitor.

Calculations

1. Tdeltay=TRYL−TRYH
2. Tdeltax=TRXL−TRXH
3. Vertical Position=(Tdeltay+(0.5*Tmaxry))/Tmaxry
4. Horizontal Position=(Tdeltax+(0.5*Tmaxrx))/Tmaxrx
5. Tforce1=TRYL+TRYH−Tmaxry−2*(1/((Tmaxrx/(0.5*(Tmaxrx+Tdeltax)))+(Tmaxrx/(0.5*(Tmaxrx−Tdelatx))))
6. Tforce2=TRXL+TRXH−Tmaxrx−2*(1/((Tmaxry/(0.5*(Tmaxry+Tdeltay)))+(Tmaxry/(0.5*(Tmaxry−Tdelaty))))
7. Tforce=(Tforce1+Tforce2)/2

Thus, Vertical Position indicates the location of the object along the Y axis of touchpad 12. Horizontal Position indicates the location of the object along the X axis of touchpad 12. Tforce indicates the applied pressure of the object at the location. This data may be manipulated further by computer 16 to perform more advanced processing for applications such as gesture recognition.

Tforce is then converted to pressure based on a computed table of conversion factors. The time measurements are preferably performed by microprocessor 14 forty times per second. As shown, the simplicity of the circuit yields ratio metric results thus absolute values of R1, R2, R3, and R4, and C1, C2, C3, and C4 are not critical in design and construction. As readily seen, the arrangement of microprocessor 14 and timing capacitors C1, C2, C3, and C4, and resistors R1, R2, R3, and R4 is much simpler and cheaper than the complex electronic circuitry used by the prior art touchpads introduced earlier.

Touchpad 12 is capable of formatting X and Y relationships resolved in the range of 1,000 lines per inch. Z force information (downward pressure on touchpad 12) is discriminated into 256 levels. A problem with the pressure sensitive force transducer described by Eventoff for use with touchpad 12 is that the resistance RZ is much larger than the resistances RX and RY. Thus, the resistance RZ is the dominant variable for the charging time of a timing capacitor. Because the coupling of X position sensor 72 and Y position sensor 74 must occur through the resistance RZ, the pressure transducer described by Eventoff results in poor positional control. To properly be able to provide positional information (X, Y) along with pressure (Z) information, the resistive ink formulation of position sensors 72 and 74 have been altered from the formulation used by Eventoff.

Position sensors 72 and 74 are a semiconductive ink consisting of four basic components. The components are carbon, resin, filler, and solvent. The primary difference between the force transducer of Eventoff and position sensors 72 and 74 is an improved filler material, stannous oxide. Prior art formulations use an approximate 3:1 ratio of filler to the appropriate blend of carbon/resin/solvent mixture. Position sensors 72 and 74 use only an approximate 20% loading of filler to the carbon/resin/solvent blend. The reduced amount of filler quickly drops the initial resistance RZ down to a lower range to accurately calculate the position of contact point 86. Thus, upon contact, the resistance RZ is of the same magnitude of the resistances RX and RY. Specifically, the resistance RZ falls within a range of 4 to 2 Kilo ohms when the activation force is between 15 to 100 grams. At 10 grams, the resistance RZ is low enough to allow conduction. Prior art formulations have a resistance RZ falling within the range of 20 to 10 Kilo ohms when the activation force is between 15 and 100 grams. Resistances in this range are far greater than the resistances RX and RY. At 10 grams, the resistance RZ is too high to allow conduction or meaningful positional information. As a result, a primary advantage of the present invention is the low activation force of about 10 grams required for touching touchpad 12.

Figure 12:
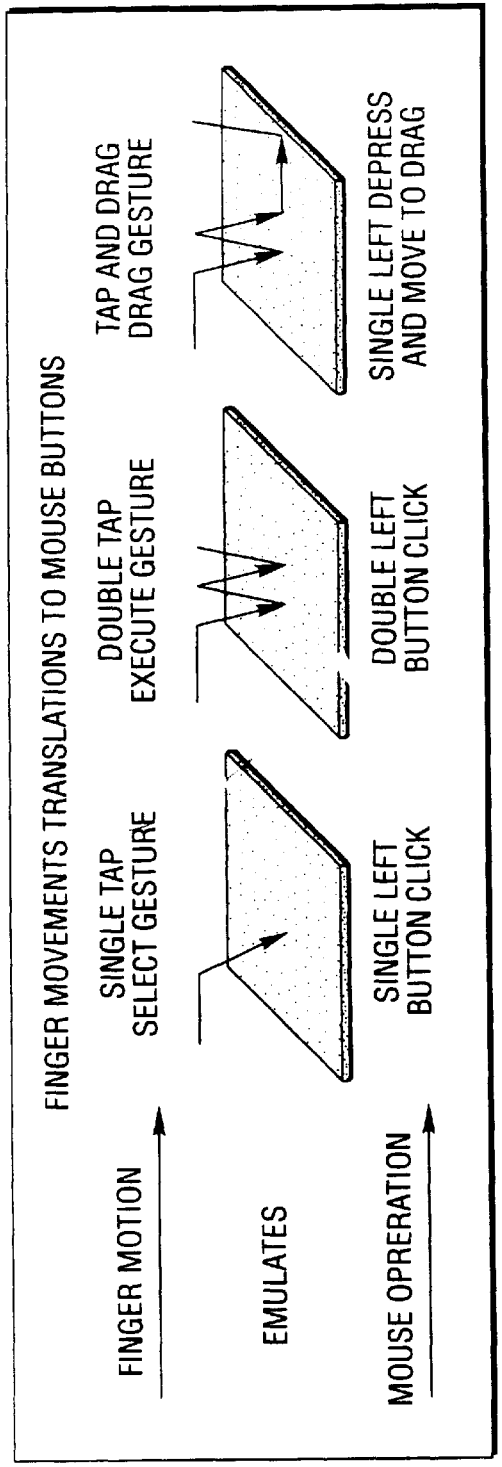
FIG. 12 illustrates a single tap selection gesture, a double tap execution gesture, and a tap and drag dragging gesture performed on the touchpad.

Referring now to FIG. 12, touchpad 12 includes selection, execution, and drag functions to fully emulate mouse cursor control functions. The selection, execution, and drag functions are implemented by emulating the generic click, double click, and click and drag functions performed by the left mouse button as defined in typical computer systems.

A feature of touchpad assembly 10 is that during normal operation, pressure threshold settings for different size and shape pressure activators are automatically adjusted. A pressure threshold setting is accomplished by long term averaging where the data points are gathered during actual operation of the device. The pressure threshold setting is then used to determine if the tap and click operations have been asserted with a pressure that is proportional to the average pressure used.

Another feature of touchpad assembly 10 is that touchpad 12 has an edge continuation motion feature for assisting in drag operations. During dragging, when an edge of touchpad 12 has been reached cursor 24 is scrolled at a fixed rate and angle based on the rate and angle of the drag just prior to reaching the edge of the touchpad. The edge continuation motion terminates whenever the pressure activation is removed, or the activation is moved from the edge of touchpad 12.

Touchpad assembly 10 may employ filtering algorithms for cursor control. Touchpad 12 is sensitive enough to measure the pulse of an operator's heart when the operator touches touchpad 12. Thus, filtering algorithms which filter out all but the pressure centroid are used to enhance cursor control. Touchpad assembly 10 may also employ a form of predictive filtering to anticipate where an object touching touchpad 12 is headed. This is related primarily to movement across touchpad 12 and filtering produces a smooth transition.

Another advantage of touchpad assembly 10 includes minimal power consumption. It is estimated that touchpad assembly 10 uses 85% less power than capacitive touchpads which must always have charged capacitors. In a typical application in which a touchpad is used about 10% of the time, touchpad assembly consumes about 260 micro amps per hour. Prior art capacitive touchpads consume about 2,200 to 10,000 micro amps per hour.

Figure 13:
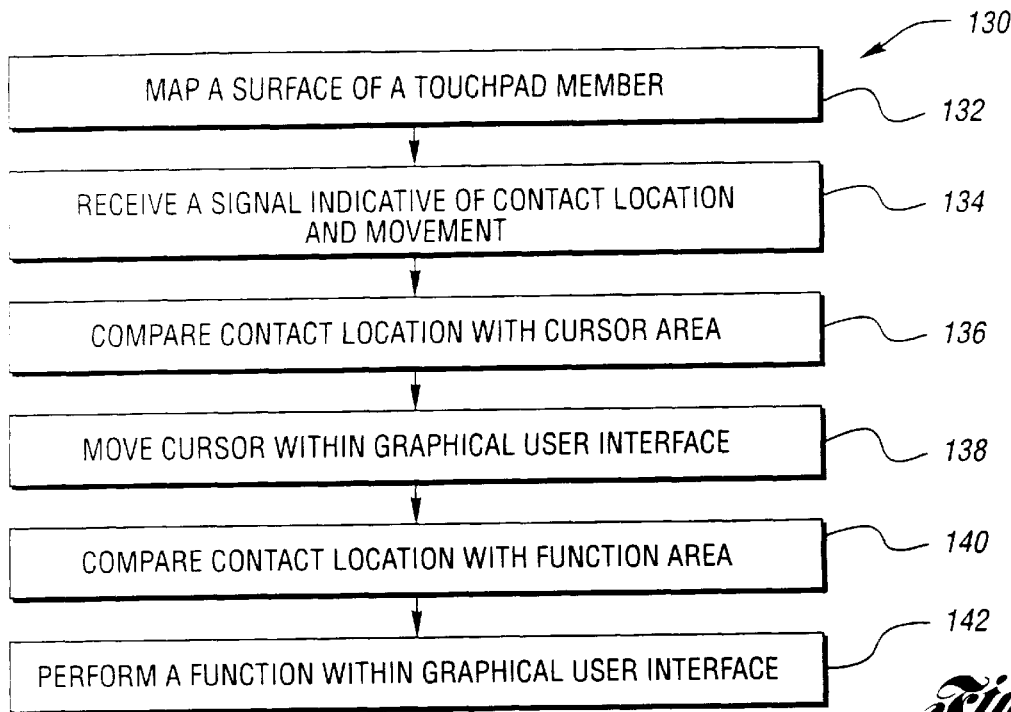
FIG. 13 is a flow diagram representing operation of a system and method of linking a touchpad to different functions within a graphic user interface operating on a computer.

Referring now to FIG. 13, a flow diagram 130 representing operation of the touchpad apparatus and method according to the present invention is shown. In general, flow diagram 130 links a touchpad to different functions with a graphical user interface operating on a computer. Flow diagram 130 begins with block 132 mapping a surface of a touchpad member. The surface is mapped to define a cursor control area and a function area. Block 134 then receives a signal. The signal is indicative of an initial user contact location and a movement on the surface of the touchpad member.

Block 136 then compares the initial user contact location with the defined cursor control area if the initial user contact falls within the defined cursor control region. In response to block 136, block 138 then moves a cursor within the graphical user interface in a manner that corresponds to the movement on the surface of the touchpad member. Block 140 then compares the initial user contact location with the defined function area if the user contact falls within the function area. In response to block 140, block 142 performs a corresponding function within the graphical user interface.

Figure 14:
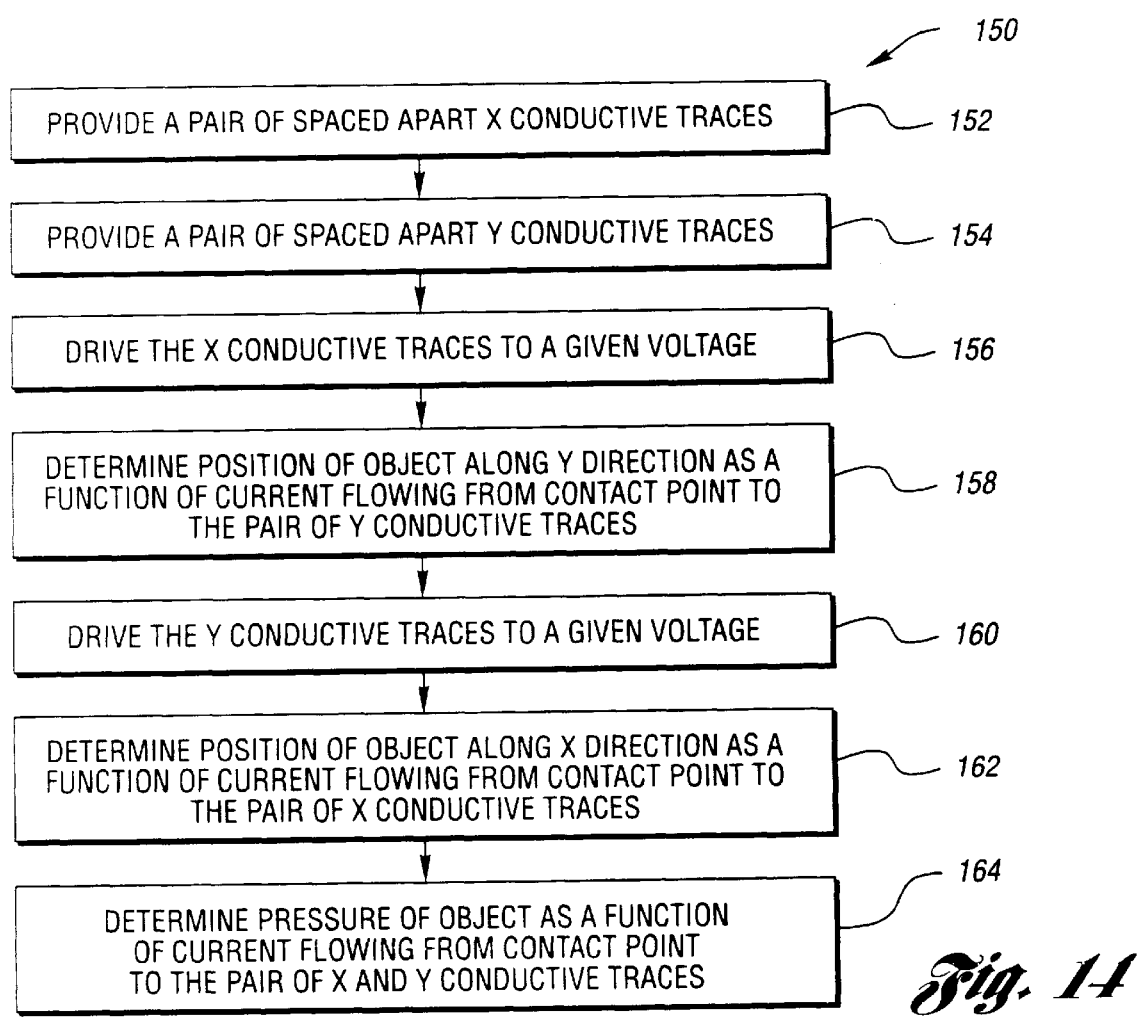
FIG. 14 is a flow diagram representing operation of a system and method for providing a signal to a computer representative of an object touching a touchpad.

Referring now to FIG. 14, a flow diagram 150 representing operation of the touchpad apparatus and method according to the present invention is shown. In general, flow diagram 150 provides a signal to a computer representative of a position and applied pressure of an object touching a touchpad. Flow diagram 150 begins with block 152 providing a pair of spaced apart X conductive traces. The X conductive traces run across opposite ends of the X sensor layer in a Y direction such that a resistance RX between the opposite ends of the X sensor layer connects the pair of spaced apart X conductive traces. Block 154 then provides a pair of spaced apart Y conductive traces. The Y conductive traces run across opposite ends of the Y sensor layer in an X direction generally perpendicular to the Y direction such that a resistance RY between the opposite ends of the Y sensor layer connects the pair of spaced apart Y conductive traces.

Block 156 then drives the X conductive traces to a given voltage so that current flows from the contact point through a variable pressure resistance RZ across variable position resistances to the pair of Y conductive traces. Block 158 then determines the position of the object along a Y direction on the Y sensor layer as a function of the current flowing from the contact point to the pair of Y conductive traces. The current varies as a function of the variable pressure resistance RZ and the variable position resistances connecting the pair of Y conductive traces to the contact point.

Block 160 then drives the Y conductive traces to a given voltage so that current flows from the contact point through a variable pressure resistance RZ across variable position resistances to the pair of X conductive traces. Block 162 then determines the position of the object along an X direction on the X sensor layer as a function of the current flowing from the contact point to the pair of X conductive traces. The current varies as a function of the variable pressure resistance RZ and the variable position resistances connecting the pair of X conductive traces to the contact point.

Block 164 then determines the applied pressure of the object touching the touchpad from the currents flowing from the contact point to the pairs of X and Y conductive traces.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A touchpad for providing a signal to a computer indicative of the location and applied pressure of an object touching the touchpad, the touchpad comprising:
   a pad having a touch surface;
   a first sensor layer;
   a first pair of spaced apart conductive traces running across opposite ends of the first sensor layer in a first direction such that a first resistance between the opposite ends of the first sensor layer connects the first pair of conductive traces;
   a second sensor layer; and
   a second pair of spaced apart conductive traces running across opposite ends of the second sensor layer in a second direction generally perpendicular to the first direction such that a second resistance between the opposite ends of the second sensor layer connects the second pair of conductive traces;
   wherein the first and second sensor layers come into contact at a contact point when an object asserts a pressure on the touch surface of the pad, wherein the contact point is connected to each conductive trace by a pressure resistance associated with the first and second sensor layers and position resistances of the first and second sensor layers, wherein the pressure resistance varies as a function of the pressure asserted and the position resistances vary as a function of the distance of the contact point from the conductive traces.

2. The touchpad of claim 1 further comprising:
   a first pair of timing capacitors each connected to a respective one of the first pair of conductive traces; and
   a second pair of timing capacitors each connected to a respective one of the second pair of conductive traces.

3. The touchpad of claim 2 further comprising:
   a microprocessor operative with the timing capacitors, wherein the microprocessor controls and monitors charging time of the timing capacitors to determine the position and asserted pressure of the object on the touch surface of the pad.

4. The touchpad of claim 3 wherein:
   the charging time of a timing capacitor is a function of the pressure resistance and the position resistance connecting the contact point to the one of the conductive traces that the timing capacitor is connected.

5. The touchpad of claim 3 wherein:
   the microprocessor drives the first pair of conductive traces to a given voltage so that current flows from the contact point through the pressure resistance, the position resistances, and the second pair of conductive traces to the second pair of timing capacitors, wherein the microprocessor monitors the charging time for the current to charge the second pair of timing capacitors to determine the position of the object along the first direction.

6. The touchpad of claim 5 wherein:
   current flows from the contact point through the pressure resistance, a position resistance connecting the contact point and one of the second pair of conductive traces, the one of the second pair of conductive traces, and then to one of the second pair of timing capacitors, wherein the microprocessor monitors the charging time for the current to charge the one of the second pair of timing capacitors to determine the distance of the object from the one of the second pair of conductive traces along the first direction.

7. The touchpad of claim 6 wherein:
   current flows from the contact point through the pressure resistance, a position resistance connecting the contact poit and the other one of the second pair of conductive traces, the other one of the second pair of conductive traces, and then to the other one of the second pair of timing capacitors, wherein the microprocessor monitors the charging time for the current to charge the other one of the second pair of timing capacitors to determine the distance of the object from the other one of the second pair of conductive traces along the first direction.

8. The touchpad of claim 3 wherein:
   the microprocessor drives the second pair of conductive traces to a given voltage so that current flows from the contact point through the pressure resistance, the position resistances, and the first pair of conductive traces to the first pair of timing capacitors, wherein the microprocessor monitors the charging time for the current to charge the first pair of timing capacitors to determine the position of the object along the second direction.

9. The touchpad of claim 8 wherein:

current flows from the contact point through the pressure resistance, a position resistance connecting the contact point and one of the first pair of conductive traces, the one of the first pair of conductive traces, and then to one of the first pair of timing capacitors, wherein the microprocessor monitors the charging time for the current to charge the one of first pair of timing capacitors to determine the distance of the object from the one of the first pair of conductive traces along the second direction.

10. The touchpad of claim 9 wherein:

current flows from the contact point through the pressure resistance, a position resistance connecting the contact point and the other one of the first pair of conductive traces, the other one of the first pair of conductive traces, and then to the other one of the first pair of timing capacitors, wherein the microprocessor monitors the charging time for the current to charge the other one of the first pair of timing capacitors to determine the distance of the object from the other one of the first pair of conductive traces along the second direction.

11. The touchpad of claim 1 wherein:

the pressure resistance falls within a range having the same order of magnitude of the first and second resistances of the first and second sensor layers when the asserted pressure is between 15 to 100 grams.

12. The touchpad of claim 1 wherein:

the pressure resistance enables conduction of current when the asserted pressure is around 10 grams.

13. The touchpad of claim 1 wherein:

each of the sensor layers comprise carbon, resin, filler, and solvent, wherein each of the sensor layers have a 1:5 ratio of the filler to a blend of the carbon, the resin, and the solvent.

14. The touchpad of claim 13 wherein:

the filler is stannous oxide.

15. A touchpad assembly for providing a signal to a computer indicative of the location and applied pressure of an object touching the touchpad assembly, the touchpad assembly comprising:

a pad having a touch surface;

a first sensor layer;

a first pair of spaced apart conductive traces running across opposite ends of the first sensor layer in a first direction such that a first resistance between the opposite ends of the first sensor layer connects the first pair of conductive traces;

a second sensor layer;

a second pair of spaced apart conductive traces running across opposite ends of the second sensor layer in a second direction generally perpendicular to the first direction such that a second resistance between the opposite ends of the second sensor layer connects the second pair of conductive traces;

the second sensor layer being disposed beneath the first sensor layer such that the first and second sensor layers come into contact at a contact point when an object asserts a pressure on the touch surface of the pad, wherein the contact point is connected to each conductive trace by a pressure resistance associated with the first and second sensor layers and position resistances of the first and second sensor layers, wherein the pressure resistance varies inversely as a function of the pressure asserted and the position resistances vary proportionally as a function of the distance of the contact point from the conductive traces;

a first pair of timing capacitors each connected to a respective one of the first pair of conductive traces;

a second pair of timing capacitors each connected to a respective one of the second pair of conductive traces; and a microprocessor operative with the timing capacitors, wherein the microprocessor controls and monitors charging time of the timing capacitors to determine the position and asserted pressure of the object on the touch surface of the pad.

16. The touchpad of claim 15 wherein:

the charging time of a timing capacitor is a function of the pressure resistance and the position resistance connecting the contact point to the one of the conductive traces that the timing capacitor is connected.

17. A touchpad assembly for providing a signal to a computer indicative of the location and applied pressure of an object touching the touchpad assembly, the touchpad assembly comprising:

a pad having a touch surface;

an X position sensor layer having a pair of spaced apart X conductive traces running across opposite ends of the X sensor layer along a Y direction such that a resistance RX between the opposite ends of the X sensor layer connects the pair of X conductive traces;

a Y position sensor layer having a pair of spaced apart Y conductive traces running across opposite ends of the Y sensor layer along an X direction generally perpendicular to the Y direction such that a resistance RY between the opposite ends of the Y sensor layer connects the pair of Y conductive traces, wherein the Y sensor layer is disposed adjacent the X sensor layer such that the X and Y sensor layers come into contact at a contact point when an object asserts a pressure on the touch surface of the pad, wherein the contact point is connected to each conductive trace by a pressure resistance RZ associated with the X and Y sensor layers and position resistances of the X and Y sensor layers, wherein the pressure resistance RZ varies as a function of the pressure asserted and the position resistances vary as a function of the distance of the contact point from the conductive traces;

a first pair of timing capacitors each connected to a respective one of the pair of X conductive traces;

a second pair of timing capacitors each connected to a respective one of the pair of Y conductive traces; and a microprocessor operative with the timing capacitors, wherein the microprocessor controls and monitors charging time of the timing capacitors to determine the position and asserted pressure of the object on the touch surface of the pad.

18. A method for providing a signal to a computer representative of a position and asserted pressure of an object touching a touchpad having X and Y position sensor layers, wherein the X and Y sensor layers are Z pressure sensitive and come into contact at a contact point when the object touches the touchpad, the method comprising:

providing a pair of spaced apart X conductive traces running across opposite ends of the X sensor layer along a Y direction such that a resistance RX between the opposite ends of the X sensor layer connects the pair of X conductive traces;

providing a pair of spaced apart Y conductive traces running across opposite ends of the Y sensor layer along an X direction generally perpendicular to the Y direction such that a resistance RY between the opposite ends of the Y sensor layer connects the pair of Y conductive traces;

driving the X conductive traces to a given voltage so that current flows from the contact point through a pressure resistance RZ across position resistances to the pair of Y conductive traces;

determining the position of the object along a Y direction on the Y sensor layer as a function of the current flowing from the contact point to the pair of Y conductive traces, wherein the current varies as a function of the pressure resistance RZ and the position resistances connecting the pair of Y conductive traces to the contact point;

driving the Y conductive traces to a given voltage so that current flows from the contact point through a pressure resistance RZ across position resistances to the pair of X conductive traces;

determining the position of the object along an X direction on the X sensor layer as a function of the current flowing from the contact point to the pair of X conductive traces, wherein the current varies as a function of the pressure resistance RZ and the position resistances connecting the pair of X conductive traces to the contact point; and determining the Z pressure of the object touching the touchpad from the currents flowing from the contact point to the pairs of X and Y conductive traces.

19. The method of claim 18 wherein: determining the position of the object along a Y direction on the Y sensor layer as a function of the current flowing from the contact point to the pair of Y conductive traces comprises determining the time required for the current to charge a pair of timing capacitors connected to respective ones of the pair of Y conductive traces.

20. The method of claim 18 wherein: determining the position of the object along an X direction on the X sensor layer as a function of the current flowing from the contact point to the pair of X conductive traces comprises determining the time required for the current to charge a pair of timing capacitors connected to respective ones of the pair of X conductive traces.

21. The touchpad of claim 1 wherein:

the pressure resistance varies inversely as a function of the pressure asserted on the touch surface of the pad.

22. The touchpad of claim 1 wherein:

the position resistances vary proportionally as a function of the distance of the contact point from the conductive

* * * * *

UNITED STATES PATENT AND TRADEMARK OFFICE
CERTIFICATE OF CORRECTION

PATENT NO.   : 6,239,790 B1  
DATED        : May 29, 2001  
INVENTOR(S)  : John K. Martinelli et al.

It is certified that error appears in the above-identified patent and that said Letters Patent is hereby corrected as shown below:

<u>Column 16, claim 7,</u>  
Line 49, replace "poit" with -- point --.

Signed and Sealed this

Fifteenth Day of January, 2002

Attest:

JAMES E. ROGAN  
*Director of the United States Patent and Trademark Office*

*Attesting Officer*